July 30, 1968  R. H. VARIAN  3,395,337
APPARATUS AND METHOD FOR IDENTIFYING SUBSTANCES
Filed Jan. 3, 1952  3 Sheets-Sheet 1

INVENTOR
RUSSELL H. VARIAN
BY
Paul B. Hunter
ATTORNEY

July 30, 1968 R. H. VARIAN 3,395,337
APPARATUS AND METHOD FOR IDENTIFYING SUBSTANCES
Filed Jan. 3, 1952 3 Sheets-Sheet 2
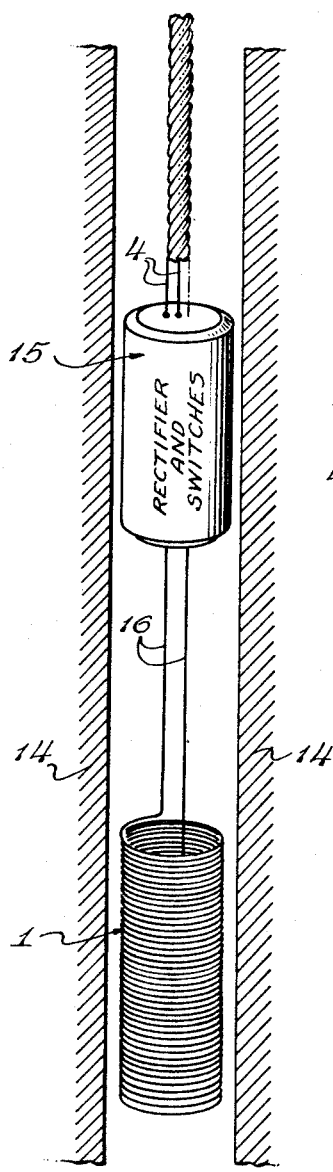
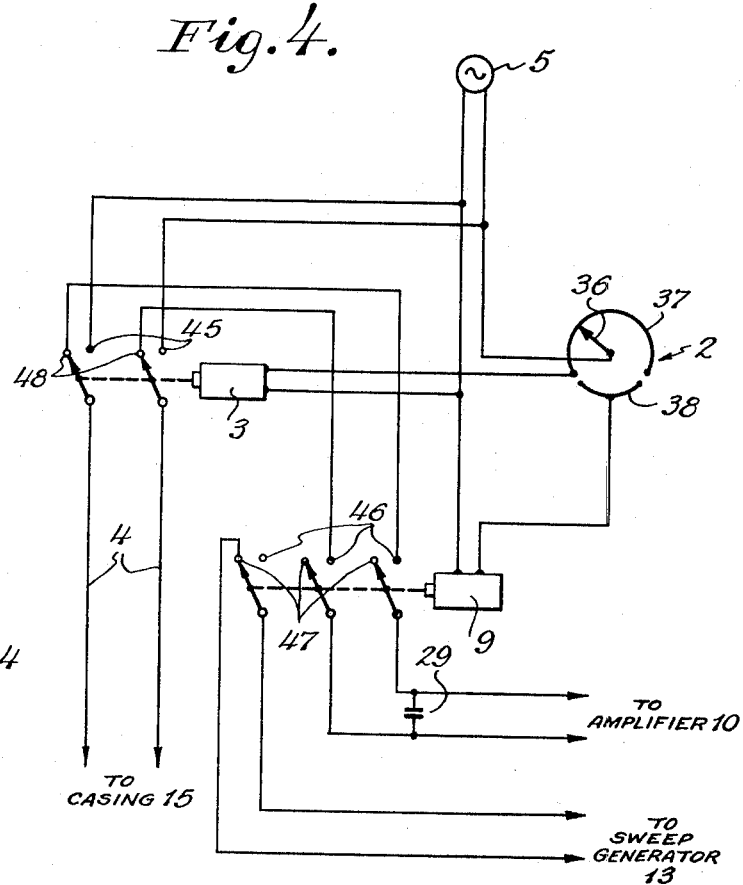
INVENTOR
RUSSELL H. VARIAN
BY
Paul B. Hunter
ATTORNEY July 30, 1968 R. H. VARIAN 3,395,337
APPARATUS AND METHOD FOR IDENTIFYING SUBSTANCES
Filed Jan. 3, 1952 3 Sheets-Sheet 3

INVENTOR
RUSSELL H. VARIAN
BY
ATTORNEY

United States Patent Office 3,395,337
Patented July 30, 1968

3,395,337
APPARATUS AND METHOD FOR IDENTIFYING SUBSTANCES
Russell H. Varian, Cupertino, Calif., assignor to Varian Associates, San Carlos, Calif., a corporation of California
Filed Jan. 3, 1952, Ser. No. 264,821
18 Claims. (Cl. 324—.5)

ABSTRACT OF THE DISCLOSURE

A subsurface well logging method and apparatus is disclosed whereby electric current is passed through a polarizing coil suspended in a well bore so as to create a polarizing field which serves to align the nuclei in the fluid surrounding the coil. After a predetermined time the current flow is interrupted leaving the polarized nuclei to precess in the earth's magnetic field and in so doing to induce a damped sinusoidal signal in the coil. This signal is then detected as an indicator of the substances at various points along the well bore.

---

This invention relates generally to the correlation of nuclear properties of atoms with their associated atoms, to identify chemical compounds, and the invention has reference, more particularly, to the determination of the presence of certain compounds or substances by virtue of their nuclear interactions with magnetic fields, the said invention being especially useful in connection with exploring oil wells.

Heretofore, in exploring oil wells, known as logging, various indirect methods of detecting the presence of oil have been used, such as, for example, electrical resistance measurements in the well or the drilling for samples of materials at various depths. However, all of these methods are open to objections either because, for example, of the uncertainties of the results obtained or because of excessive cost involved, etc. In my United States Patent No. 2,561,490, issued July 24, 1951, entitled Method and Means for Correlating Nuclear Properties of Atoms and Magnetic Fields, now Reissue Patent Re. 23,769, issued Jan. 12, 1954, there is described apparatus for determining the chemical composition of any desired specimen of matter by applying a polarizing magnetic field in the specimen, removing said field and then detecting the free precessions of the nuclei of said sample in the earth's magnetic field.

The principal object of the present invention is to provide a novel method and means for use in well logging by determining the presence of desired compounds by means of their nuclear interactions with magnetic fields.

Another object of the present invention is to provide a novel and accurate method and means for determining the presence of petroleum beneath the earth's surface; the said method comprising inserting into a bore in the earth the novel means of this invention capable of producing and detecting precessions of nuclei, to thereby accurately determine the presence of petroleum owing to the known precessional properties of petroleum.

Still another object of this invention is to provide a novel well logging means for determining the nuclear induction characteristics of a substance in a well bore when said characteristics are not already known.

Still another object of the present invention is to determine the presence of desired substances in well bores, such as petroleum, by setting up a polarizing magnetic field for polarizing the nuclei or bodies possessing the properties of gyroscopic moment and magnetic moment in the substance, suddenly removing said field and then measuring the precessions of the nuclei or bodies in the earth's or other field to determine the time required for said precessions to decay this time being known as the relaxation time.

In order for the reader to understand the principles of the present invention, it is essential that he be acquainted with the fundamental principles of nuclear induction. In this connection, attention is called to my above-mentioned Patent No. 2,561,490, particularly from column 1, line 17, to column 5, line 45.

There are essentially two independent and different sources of the damping forces in nuclear induction. The first of these is the interaction of the precessing nuclei with the surrounding matter, which may cause the nucleus to transfer its energy of precession to the motion of nearby atoms and cease precessing. This damping force is truly a frictional force, for like the large-scale mechanical frictional forces it changes kinetic energy into thermal energy. The second source of damping out of a signal is caused by the fact that not all nuclei are in exactly the same magnetic field and therefore do not have exactly the same precession frequency. As a result, nuclei which at a given time are precessing in phase or coherently, that is, with their axes all pointing in the same direction, may, after a sufficient amount of time, end up precessing in various phases or incoherently. When this occurs it will be impossible to detect the presence of the precessions, even though the individual nuclei are precessing as before. Although this damping effect is not strictly speaking a frictional force, it acts like a frictional force on the detecting apparatus and we shall find it convenient to discuss the two damping effects in the same terms.

A quantity of great importance for present purposes is the time required for these damping forces to act and effect decay of the signal induced in a receiver coil by the precessing nuclei. When the nuclei are precessing coherently, the induced signal is at maximum strength, the signal strength decaying as the nuclei precess less and less coherently or as individual nuclei cease precessing. This time we call the relation time. Actually, the time due to the effect of this first source mentioned above is commonly referred to as $T_1$ while the time due to the effect of the second source is commonly referred to as $T_2^*$. The relaxation time referred to above is commonly called $T_2$ and is given by $$\frac{1}{T_2} = \frac{1}{T_1} + \frac{1}{T_2^*}$$

Experiment shows that relaxation times may have values extending from $10^{-5}$ seconds or less to many minutes or more. From the above discussion on the source of the damping forces it is obvious that the relaxation time depends on the surroundings of the individual nuclei. Thus, the nature of the compound containing the nucleus, the homogeneity of the magnetic field, the state of the substance, whether solid, liquid, or gas, the presence of dissolved foreign materials, and the temperature are some of the factors that influence the relaxation time. Each substance in the pure state has its own characteristic relaxation time.

For example, since the molecular composition of oil is quite different from that of water, the nuclear relaxation time for constituent hydrogen nuclei is quite different for oil than for water. The present invention is designed to detect oil even in the presence of water by virtue of said difference in relaxation times.

In the present invention, the polarizing field is applied to the sample or substance containing the nuclei in the well bore so as to polarize the atomic nuclei at an angle with respect to the precessional field. The polarizing field is then quickly shut off, leaving the nuclei polarized by the polarizing field to precess about the precessional field. It is desirable for optimum operation that the polarizing field shall be shut off in a time short compared to the relaxation time of the nuclei previously discussed. This requirement will be obvious if it is considered that there will be little or no polarization left if the polarizing field is shut off so slowly that the polarization can die out as the field decreases. It is also desirable for optimum operation that the polarizing field be reduced from a value equal to the precessional field to zero in a time short compared to one cycle of the nuclear precession. This requirement is not quite so obvious and no full explanation will be attempted here. It is well known, however, from the theory of precessing gyroscopes that the axis around which precession takes place is parallel to the direction of the forces constituting the applied force couple causing the precession. If the direction of the applied force couple changes by only a small angle in each precession cycle, the axis around which precession takes place will follow quite exactly. Obviously the direction of the force couple during the time when the polarization field is decreasing is the resultant of the residual polarizing field and the field to be measured. The resultant does not begin to change its direction rapidly until the dying polarizing field and the field to be measured are of comparable magnitude. Since the nuclei precessing around the resultant field are equally distributed in all phases, their average direction of polarization is in the direction of the resultant field. If the polarization is allowed to follow the resultant field until only the field to be measured is left, the polarization will be lined up with the field to be measured, and therefore will not precess. To avoid this result, a large change in the direction of the resultant must occur in a time short compared to a cycle of the precession frequency. This is equivalent to the requirement above stated that the polarizing field be reduced from a value equal to the field to be measured to zero in a time short compared to a cycle of the precession frequency. Both these conditions are easily met in practice.

In my aforementioned patent the free precessions following removal of a strong field are measured as to their frequency, so as to correlate the frequency of precession with the precessional field. The relaxation time is of no value, if it is not long enough to allow satisfactory determination of the frequency. In the present embodiment this is not the case. This embodiment includes no provision for frequency measurement (although frequency measurements may be made during well logging, if desired, by utilization of the frequency counting technique disclosed in the above cited patent, Re. 23,769) and in fact, for most purposes, the precessional frequency need not be known, except in the event that it may be desirable to tune the apparatus to reject extraneous signals. Instead, the present invention contains means for accurately measuring the free precession signals and the relaxation of times of samples or substances within the well bore brought within range of the signal head in the bore.

The following description describes a preferred form of apparatus as designed for use in an oil well. However, other forms of apparatus suitable for use in well logging are to be considered within the scope of this invention.

Other objects and advantages will become apparent from the specification, taken in connection with the accompanying drawings wherein the invention is embodied in concrete form.

In the drawings:

FIG. 3 is a general view of the signal apparatus suspended in a well.

FIG. 4 is a circuit diagram of the sequencing circuit.

Similar characters of reference are used in all of the above figures to indicate corresponding parts.

Figure 1:
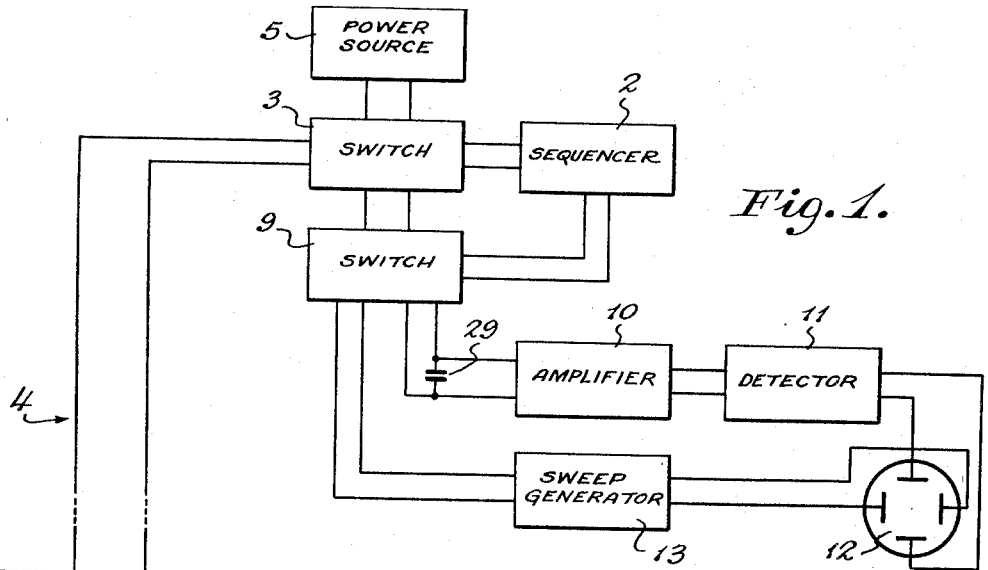
FIG. 1 is a block diagram showing the principal components of the well logging apparatus.

Referring now to FIG. 1, the reference numeral 1 designates a signal head, consisting of a coil of wire, which serves the double purpose of applying a strong magnetic field to the sample of matter around the coil to produce polarization of the nuclei of the matter, and to pick up the signal produced by the atomic nuclei precessing in the earth's field. Reference numeral 35 designates a non-linear resistor in parallel with coil 1, which makes it possible for the polarizing D.C. magnetic field to be quickly damped out but limits the voltage surge when the circuit is opened to safe values when it is desired to pick up the nuclear precessions. Rectifier 7 rectifies the A.C., supplied from above the surface of the ground, into D.C. for use by coil 1, so that said coil may produce a steady magnetic field. Transformer 31 serves the double purpose of stepping down the A.C. power supplied from above ground before application to rectifier 7, and of stepping up the weak nuclear induction voltage signals so that said signals may be transmitted to the sensitive detecting apparatus located above ground. Switches 6 and 8 are employed for switching rectifier 7 in and out of the circuit of coil 1, depending on whether or not coil 1 is to be used for producing a polarizing magnetic field or for picking up the nuclear precession signals. The operation of switches 6 and 8 is controlled by the presence or absence of A.C. supply voltage on transformer 31; said operation will be discussed in another part of this specification.

The parts of the apparatus heretofore described are designed to be lowered into the well hole or bore. They are suspended by cable 4 which also provides electrical conductors for supplying A.C. power to components within the well and for transmitting nuclear precession signals picked up by same to the surface. The remainder of the apparatus may be located above the surface of the ground. Said apparatus comprises power source 5, which supplies A.C. power to the entire system, sequencer 2, which determines the time sequence of switching events, switches 3 and 9, amplifier 10, detector 11, cathode ray oscilloscope 12, and its associated horizontal sweep generator 13.

The operation of this invention is as follows: At a certain time sequencer 2 operates switch 3 so as to connect cable 4 directly to power source 5. With A.C. on cable 4, switches 6 and 8 operate so as to connect coil 1 to the power source via rectifier 7 and transformer 31. Coil 1 is thus producing a steady magnetic field in the sample (the substance within the bore and the walls of the bore). After a time that is long compared to the time $T_1$ of the sample, sequencer 2 operates switch 3 so as to disconnect cable 4 from power source 5. With no power on cable 4, switches 6 and 8 act in such a way as to connect coil 1 directly to transformer 31. Coil 1 can then transmit nuclear induction signals to the surface via transformer 31 and cable 4. After sufficient time has elapsed to allow the switching operation of switches 6 and 8 to take place, sequencer 2 operates switch 9 so as to connect cable 4 to amplifier 10. A condenser 29 shunted across the input of amplifier 10 forms a tuned circuit comprising said condenser, transformer 31 and coil 1. Said tuned circuit is tuned approximately to the frequency of the precessions picked up by coil 1. The nuclear induction signals produced in coil 1 are thus impressed on amplifier 10, and the amplifier signals are impressed on detector 11, which rectifies the alternating component of the signals and leaves only the exponentially decaying envelope. This envelope signal is impressed on the vertical plates of a cathode ray oscilloscope 12. The horizontal sweep of oscilloscope 12 is driven by a sweep generator 13 which starts the sweep when switch 9 is actuated. The horizontal sweep thus starts at the same instant of time as the exponentially decaying signal. The oscilloscope traces may be viewed directly or they may be photographed for inspection at a later time.

Thus it is clear that the device herein described first polarizes the nuclei in the substance within the bore and walls near the coil, then detects the precession, of the nuclei in the earth's magnetic field after removal of the polarizing field, produces the exponentially decaying signal caused by the precession of the polarized nuclei in the earth's field and presents this exponential decaying signal on the viewing screen of an oscilloscope. From the shape of the curve on the oscilloscope screen, and the speed of the horizontal sweep of the oscilloscope, the relaxation time of the sample may be readily calculated. Although optimum readings are obtained when the signal head is stopped to polarize and take a free precession reading, the signal head may be continuously moved during the logging if moved slowly enough so that the signal head remains coupled to the polarized nuclei during the free precession period. The initial signal amplitude and the decay times of the free precession signals will vary as a function of the nuclear precession substance along the well. By using a calibrated graphic screen, the signal amplitudes and decay time can be read directly from the scope.

Figure 2:
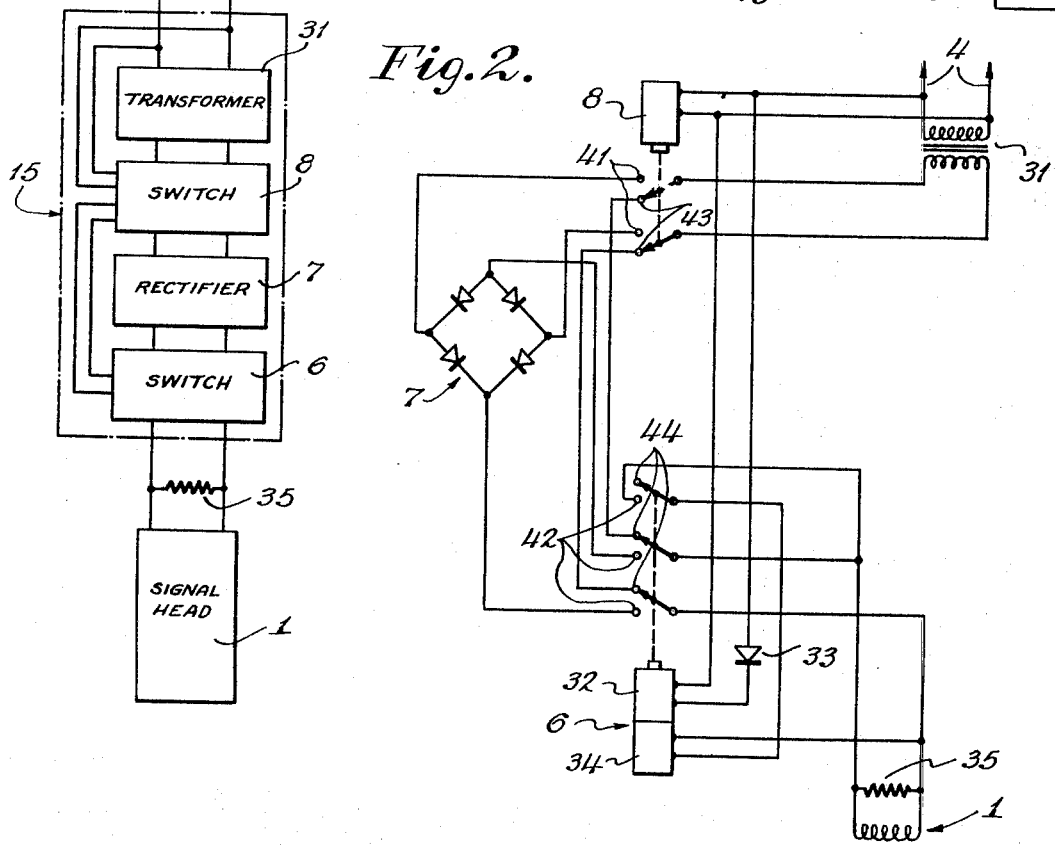
FIG. 2 is a circuit diagram of components adapted to be inserted into a well.

A circuit diagram of the electrical apparatus in the well is shown in detail in FIGURE 2. Owing to the fact that this apparatus must operate under conditions of high temperature and pressure, thermionic elements are preferably not used and only simple mechanical relays and dry rectifiers are employed. When A.C. power is supplied on cable 4, A.C. switch 8 is actuated so that the blades thereof engage contacts 41. Switch 6, a polarized relay, is also actuated because one of its two actuating coils 32 is energized from the A.C. supply via a small rectifier 33, so that its blades engage contacts 42. With both switches thus actuated, power is transmitted via transformer 31 to rectifier 7, which in turn supplies coil 1 with rectified A.C. through switch 6. The inductance of coil 1 is sufficient to filter the rectified A.C. into the necessary direct current. The actuation of switch 6 also closes the circuit for its holding coil 34, which is sensitive to voltages across coil 1.

When A.C. power is removed from line 4 by the abovementioned action of switch 3, switch 8 operates so that its contacts 43 are engaged, whereupon rectifier 7 is disconnected from transformer 31. Rectifier 7 is designed so that no D.C. current flows through transformer 31, thus no objectionable transient voltages are produced across transformer 31 by this switching process. The decay of current in coil 1 is hastened by dissipation through nonlinear resistor 35, which is shunted across coil 1. The rapid decay of current through coil 1 produces large transient voltages across said coil; to prevent said transient voltages from entering and possibly damaging transformer 31, a holding coil 34, sensitive to voltages across coil 1, holds switch 6 with contacts 42 engaged, for in this position coil 1 remains connected to rectifier 7 which is now disconnected from transformer 31. When the transient voltage has nearly died out holding coil 34 can no longer hold switch 6 and, after a short time determined by viscosity damping, the blades of switch 6 engage contacts 44, thereby connecting coil 1 directly to transformer 31 so that nuclear induction signals can be transmitted to the surface.

FIG. 3 shows those parts of the apparatus that are lowered into the well bore as they actually appear in the well. The coil 1 is the lowest part of the apparatus. It is a solenoid with its axis parallel to the axis of the well and with diameter nearly equal to that of the well. The "sample" which supplies the nuclear precessions is in this case the earth walls of the well, 14, and since a signal may be obtained from signal producing material inside the coil as well as outside, the form on which the coil is mounted should contain no material which can produce a confusing signal. The form must also be nonconducting and capable of withstanding the high temperatures and pressures encountered in a deep well. The other components of the apparatus inside the well are enclosed in a casing 15 from which coil 1 is suspended by a short length of cable illustrated as lead wires 16. The distance between casing 15 and coil 1 must be great enough so that ferromagnetic substances in container 15 do not appreciably perturb the magnetic fields around coil 1, but not so great that appreciable power losses are produced in cable 16. Cable 4 extends to the surface above container 15.

FIG. 4 shows the switching circuit comprising sequencer 2, switch 3 and switch 9. Sequencer 2 consists of a moving brush contact 36, rotated by clockwork or by a synchronous motor (not shown); brush 36 makes contact with ring segments 37 and 38 successively. When contact is made with segment 37 switch 3 is actuated by current from source 5, whereby contacts 45 are engaged; similarly, when brush 36 engages segment 38 switch 9 is actuated so that contacts 46 are engaged. The time delay between the release of switch 3 and the actuation of switch 9 (or vice versa) is provided by an open space between segments 37 and 38. Although the switches shown in this description have mechanical contacts, electronic gates would be equally suitable.

Figure 5:
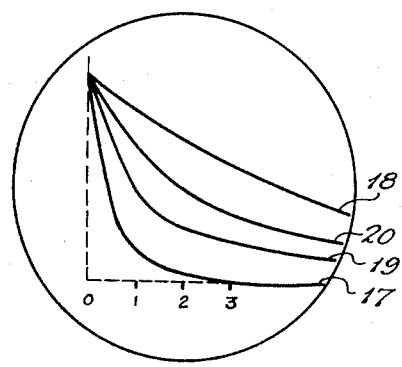
FIG. 5 shows typical oscilloscope traces produced by this invention when the sweep is linear.

FIG. 5 shows typical oscilloscope traces produced by this invention when the horizontal sweep is a linear function of time. The decay curve is given by $$A = A_0 e^{\frac{-t}{T_2}}$$

where $A_0$ is the initial amplitude (which is a function, for example, of the number of nuclei contributing to the free precession signal and thus the amount of oil and water near the signal head), $t$ is the elapsed time in seconds and $T_2$ is the relaxation time. Trace 17 shows the exponential decay produced by a substance which we will call substance A, and trace 18 shows the decay produced by a substance B which has a relaxation time ten times that of substance A. Traces 19 and 20 show the results of mixtures of the two substances $\frac{2}{3}A+\frac{1}{3}B$ and $\frac{1}{3}A+\frac{2}{3}B$ respectively. Thus, it is easy to see how one may determine the relative mixture of two substances of different relaxation times by comparing the decay curve with standard decay curves for each substance alone. The relaxation times of the above four substances with reference to this figure, may be stated as being the time, plotted along the abscissas, required for the signal amplitude, plotted along the ordinate, to decay to about .37 of its maximum value shown at zero time.

Figure 6:
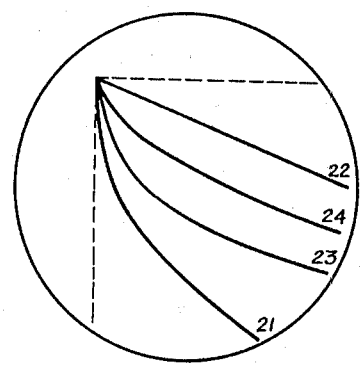
FIG. 6 shows typical oscilloscope traces when the sweep is an inverse exponential function of time.

FIG. 6 shows oscilloscope traces produced when the sweep rate decays exponentially with time. Traces 21, 22, 23, and 24 are produced instead of traces 17, 18, 19, and 20, respectively, of FIG. 5 when this exponential sweep rate is used. In FIG. 6, the sweep rate has been chosen so that trace 22, of substance B is a straight line Since small amounts of substance A mixed with B will perturb the trace from a straight line, and since small deviations from a straight line are easily measurable, this method is especially useful for detecting small amounts of one substance in the presence of large amounts of another, for example, A in the presence of B. The sweep time constant may be adjusted to other values to meet special measuring conditions.

Figure 7:
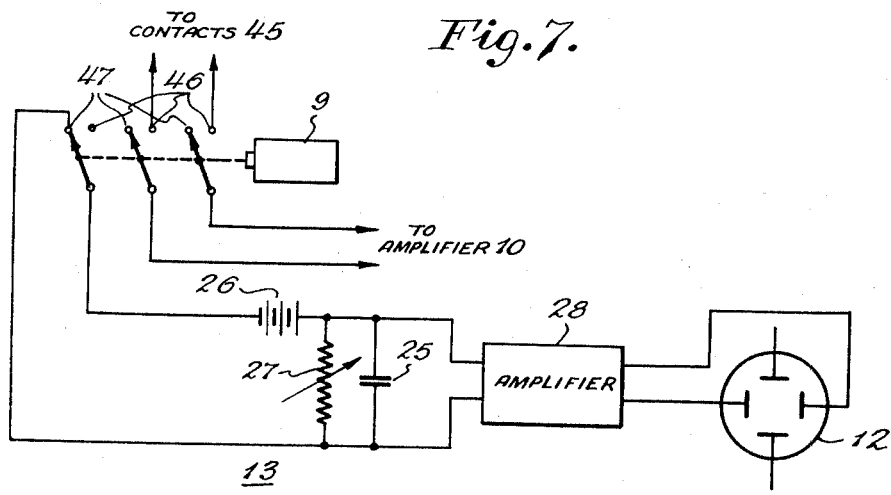
FIG. 7 shows a circuit for producing an exponential sweep.

FIG. 7 shows the detail of sweep generator 13 when it is designed to produce the exponential sweep of FIG. 6. The circuit is shown merely as illustrative of a method for producing exponential sweeps, since this circuit and others for performing the same function are well known in the electronic art. A capacitor 25 is charged to a D.C. potential by a voltage source, indicated schematically by battery 26. When switch 9 is actuated by sequencer 2, engaging contacts 46, contacts 47 are disengaged. Since one contact 47 is in series with battery 26, said battery is now open-circuited, whereupon capacitor 25 discharges through shunt resistor 27 at an exponential rate determined by the RC constant of capacitor 25 and resistor 27. The exponentially decaying voltage across capacitor 25 is impressed on amplifier 28, which impresses it on the horizontal plates of oscilloscope 12 thereby producing the exponential sweep. The time constant of the decay can be adjusted by varying resistor 27.

The power supplies, amplifiers, detector, switches and oscilloscope are of perfectly conventional design and need not be discussed in detail here.

Since many changes could be made in the above construction and many apparently different embodiments of this invention could be made without departing from the scope thereof, it is intended that all matter contained in the above description or shown in the accompanying drawings shall be interpreted as illustrative and not in a limiting sense.

What is claimed is:

1. The method of well logging which comprises the steps of providing a polarizing magnetic field in the well bore to thus polarize the nuclei in the bore and earth surrounding the bore in the direction of the polarizing field, removing the polarizing field after the polarization to thereby permit the nuclei to precess in the earth's magnetic field, picking up a signal produced by the precessing nuclei, and measuring the decay time of the signal produced by the precessing nuclei.

2. Well logging apparatus comprising means for producing a unidirectional polarizing magnetic field in a well bore to thereby polarize bodies possessing the properties of magnetic moment and gyroscopic moment in the bore and earth surrounding the bore, said means including means for eliminating the polarizing magnetic field after polarization of the bodies, means in the bore having an alternating signal induced therein by the magnetic field produced by the precession of the bodies in another unidirectional magnetic field enveloping the bodies in a direction at an angle to the polarizing field, and means coupled to said last means located at the surface of the earth for indicating the induced free precession alternating signals.

3. Well logging apparatus as claimed in claim 2 wherein said other magnetic field is the earth's magnetic field.

4. Well logging apparatus comprising means for producing a polarizing unidirectional magnetic field in a well bore to thereby polarize the nuclei in the bore and earth surrounding the bore, means for eliminating the polarizing magnetic field after polarization of the nuclei, means in the bore for detecting the coherent precession of the nuclei in another unidirectional magnetic field enveloping the nuclei at an angle to the polarizing magnetic field and means for indicating the time required for the precessing nuclei to deviate a determined amount from said coherent precession.

5. Well logging apparatus as claimed in claim 4 wherein said other magnetic field is the earth's magnetic field.

6. Well logging apparatus comprising means for producing a polarizing magnetic field in the earth surrounding a well bore in a direction at an angle to the earth's magnetic field to thereby polarize the nuclei in the bore and earth surrounding the bore, in said direction and for eliminating the polarizing magnetic field after polarization of the nuclei, means in the bore for picking up a signal produced by the nuclei precessing coherently in the earth's magnetic field, and means for indicating the time decay of the signal.

7. Well logging apparatus as claimed in claim 6 wherein the means in the bore for picking up the signal comprises a coil of wire which is cut by the magnetic field produced by the nuclei precessing coherently.

8. Well logging apparatus as claimed in claim 7 wherein the means for producing the polarizing magnetic field includes as an element the coil of wire which also serves to pick up the signal.

9. Well logging apparatus comprising a coil designed to be lowered into a well bore, a power source for supplying power to the coil to thereby set up a polarizing magnetic field in the bore in a direction at an angle to the earth's magnetic field to polarize the nuclei in the bore and earth surrounding the coil, means for receiving a signal from the coil induced therein by the coherent precession of the nuclei in the earth's magnetic field when the polarizing magnetic field is removed, and switching means for alternately coupling the coil first to the power source and then to the receiving means.

10. Apparatus as claimed in claim 9 wherein said receiving means comprises an indicator for indicating the relaxation time of nuclei-containing substances in the bore and earth surrounding the coil.

11. Apparatus as claimed in claim 10 wherein said receiver comprises a sweep generator controlled by said switching means for supplying an exponential sweep to said indicator.

12. Well logging apparatus comprising a coil of wire adapted to be located in a well bore, a source of alternating current power, a rectifier, a receiver for receiving radio frequency power from the coil, and time-controlled switching means for at times coupling said coil to the source of power through the rectifier to thereby provide direct current power to the coil to thus set up a unidirectional magnetic field at an angle to the earth's magnetic field to polarize the nuclei in the bore and earth surrounding the coil and for subsequently decoupling the coil from the power source and coupling the coil to the receiver to thereby transmit to the receiver the voltages induced in the coil by the nuclei in the earth precessing in the earth's magnetic field.

13. Well logging apparatus as claimed in claim 12 wherein said receiver comprises an indicator for indicating the time decay of the voltage signals induced in the coil.

14. A method of well logging comprising the steps, performed repetitiously along the length of the well bore, of producing a unidirectional polarizing magnetic field in the well bore to thereby polarize nuclei possessing properties of magnetic moment and gyroscopic moment and comprising portions of the formation material in a section of the bore, eliminating said polarizing magnetic field after polarization of the nuclei to thereby permit precession of the nuclei in another unidirectional magnetic field enveloping the nuclei in a direction at an angle to the polarizing field, converting the alternating magnetic field produced by said precessing nuclei into an electrical signal, and indicating the electrical signal produced by the free precession of the nuclei at the surface of the earth.

15. The method as claimed in claim 14 wherein the step of converting said alternating magnetic field into an electrical signal comprises conversion of the alternating field into an exponentially decaying electrical signal.

16. A method for logging well bores comprising the steps of producing a polarizing magnetic field in the well bore at an angle to the earth's magnetic field to thereby polarize nuclei possessing properties of magnetic moment and gyroscopic moment and comprising portions of the formation material in a section of the bore, removing said polarizing magnetic field to allow said nuclei to freely precess in the earth's magnetic field and produce an alternating magnetic field, converting said alternating magnetic field into an electrical signal, and indicating said electrical signal at the surface of the well bore whereby a log of the well bore may be produced as a function of the free precession of the nuclei in the well bore.

17. A method for logging well bores comprising the steps, performed repeatedly along the well bore, of magnetically polarizing nuclei possessing properties of magnetic moment and gyroscopic moment and comprising portions of the formation material in successive sections of the bore at an angle to the earth's magnetic field and removing said polarization, said nuclei freely precessing in the earth's magnetic field after each period of polarization, converting the magnetic field produced in the well bore by the precessing nuclei into an electrical signal measurable at the surface of the earth, and indicating said electrical signal whereby a log of the well may be produced as a function of the free precessions of nuclei in the successive sections of the well bore.

18. Apparatus for logging well bores comprising magnetic means for magnetically polarizing nuclei possessing properties of magnetic moment and gyroscopic moment and comprising portions of the formation material, said means being adapted to polarize said nuclei at an angle to the earth's magnetic field in successive sections of the bore in successive time periods of polarization, means for removing said polarization whereby said nuclei may freely precess in the earth's magnetic field after each period of polarization, means for converting the magnetic field produced in the well bore by the precessing nuclei into an electrical signal measurable at the surface of the earth, and means at the surface of the earth for indicating said electrical signal, whereby a log of the well may be produced as a function of the free precession of nuclei in the successive sections of the well bore.

References Cited

UNITED STATES PATENTS

| | | | |
|---|---|---|---|
| 2,259,904 | 10/1941 | McNamee et al. | 324—8 |
| 2,294,395 | 9/1942 | Evjen | 324—1 |
| 2,535,666 | 12/1950 | Broding | 324—5 |
| 2,561,489 | 7/1951 | Black | 324—.5 |
| 2,561,490 | 7/1951 | Varian | 324—.5 |
| 2,570,111 | 10/1951 | Goble | 324—1 |
| 2,582,314 | 1/1952 | Doll | 324—6 |
| 2,589,494 | 3/1952 | Hershberger | 324—.5 |

FOREIGN PATENTS 40,722    5/1937    Netherlands.

OTHER REFERENCES

Bloembergen et al., Physical Review, Vol. 73, No. 7, April 1948, pp. 679–712.

Hahn, Physical Review, Vol. 77, No. 2, January 1950, pp. 297, 298.

RUDOLPH V. ROLINEC, *Primary Examiner.*

M. J. LYNCH, *Assistant Examiner.*